(12) United States Patent
Faerber et al.

(10) Patent No.: US 11,239,875 B2
(45) Date of Patent: Feb. 1, 2022

(54) CONCURRENT OPERATION OF INTELLIGENT TRANSPORTATION SYSTEM (ITS) RADIOS IN A SAME FREQUENCY BAND WITH A COMMON ANTENNA

(71) Applicant: Intel IP Corporation, Santa Clara, CA (US)

(72) Inventors: Michael Faerber, Wolfratshausen (DE); Kilian Roth, Munich (DE); Visvesh Saravanan, Munich (DE); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/957,129

(22) PCT Filed: Mar. 30, 2018

(86) PCT No.: PCT/US2018/025313
§ 371 (c)(1),
(2) Date: Jun. 23, 2020

(87) PCT Pub. No.: WO2019/190542
PCT Pub. Date: Oct. 3, 2019

(65) Prior Publication Data
US 2021/0006282 A1    Jan. 7, 2021

(51) Int. Cl.
*H04B 1/44*    (2006.01)
*H04B 17/21*    (2015.01)
(Continued)

(52) U.S. Cl.
CPC .............. *H04B 1/44* (2013.01); *H04B 1/3822* (2013.01); *H04B 17/21* (2015.01); *H04W 84/12* (2013.01)

(58) Field of Classification Search
CPC ... H04B 1/40; H04B 1/44; H04B 1/48; H04B 1/04; H04B 1/0475; H04B 1/10;
(Continued)

(56) References Cited

U.S. PATENT DOCUMENTS 9,520,983 B2 * 12/2016 Choi ...................... H04B 1/525
9,641,272 B2 *  5/2017 Wang ................... H04L 27/0012
(Continued)

FOREIGN PATENT DOCUMENTS

WO    2016064533 A1    4/2016
WO    2017117340 A1    7/2017

OTHER PUBLICATIONS

PCT International Search Report issued for PCT/US2018/025313, 7 pgs, dated Apr. 2, 2019.

*Primary Examiner* — Quochien B Vuong
(74) *Attorney, Agent, or Firm* — Schiff Hardin LLP (57) ABSTRACT

Methods and architectures are described to allow concurrent operation of two separate, non-synchronized, radio systems utilizing closely spaced frequency bands, such as IEEE 802.11p and LTE-V2X, or NR-V2X vehicular communications systems, with a common antenna. A full duplex-"like" active interference cancellation process may be employed that includes self-interference cancellation in the RF domain, in the analog domain and the digital baseband domain to reduce complexities and costs of stringent antenna isolation, otherwise required, for a simultaneous TX and RX mode of operation and concurrent RX mode of operation in closely spaced frequency resources.

9 Claims, 6 Drawing Sheets

(51) Int. Cl.
*H04B 1/3822* (2015.01)
*H04W 84/12* (2009.01)

(58) Field of Classification Search
CPC ...... H04B 1/1027; H04B 1/123; H04B 15/00;
H04B 15/02; H04B 1/38; H04B 1/3822;
H04B 1/403; H04B 1/54; H04B 1/525;
H04B 17/21; H04W 4/44; H04W 4/46;
H04L 5/14; H04L 5/1461; H04L 25/0328
See application file for complete search history.

(56) References Cited

U.S. PATENT DOCUMENTS

| | | | |
|---|---|---|---|
| 9,887,862 B2* | 2/2018 | Zhou | H04B 1/123 |
| 10,142,084 B2* | 11/2018 | Lee | H04B 1/525 |
| 10,243,719 B2* | 3/2019 | Bharadia | H04B 1/525 |
| 10,291,384 B2* | 5/2019 | Askar | H04B 1/1027 |
| 10,687,185 B2* | 6/2020 | Shilov | H04W 4/40 |
| 2008/0008126 A1* | 1/2008 | Shirakabe | H04B 7/2615 |
| | | | 370/329 |
| 2016/0226653 A1 | 8/2016 | Bharadia et al. | |
| 2018/0006794 A1 | 1/2018 | Lee et al. | |
| 2019/0013881 A1* | 1/2019 | Olesen | H04W 16/14 |

* cited by examiner 5.9 GHz Band (5.85-5.925 GHz)- 10 MHz channel allocation

CONCURRENT OPERATION OF INTELLIGENT TRANSPORTATION SYSTEM (ITS) RADIOS IN A SAME FREQUENCY BAND WITH A COMMON ANTENNA

FIELD

Embodiments of the present invention relate generally to, but are not limited to, multi-radio communication architectures and methods for wireless communications.

BACKGROUND

The idea of vehicles sharing information and working together to make transportation safer, greener, and more enjoyable, is compelling. The technologies associated with this concept, collectively known as Intelligent Transportation Systems (ITS) promise to reduce traffic congestion, lessen environmental impact of transportation, and significantly reduce the number of lethal traffic accidents. A key enabling technology of ITS is wireless communication, covering vehicle-to-vehicle (V2V) communication, vehicle-to-infrastructure (V2I) communication, and infrastructure-to-vehicle (I2V) communication. Collectively, these wireless transactions are referred to as V2X communication.

A wireless vehicular communication system has long been defined for this purpose by The Institute of Electrical and Electronics Engineers (IEEE) in a standard known as "802.11p," also referred to as "wireless access in vehicular environments" (WAVE) or "dedicated short range communication" (DSRC). 802.11p defines enhancements to the 802.11 wireless local area networking (WLAN) standard to support ITS applications for communicating between vehicles traveling at high speeds and/or between the vehicles and various nodes of a roadside infrastructure in the licensed ITS band of 5.9 GHz (5.85-5.925 GHz). 802.11p is also a base line for a European standard ETSI ITS G5.

A competing solution to 802.11p ITS and its WLAN-based counterparts, is cellular-based ITS derived by Third Generation Partnership Project (3GPP) Long Term Evolution (LTE) or New Radio (NR) V2X, generically and interchangeably, denoted herein as "LTE V2X" that supports V2X communications in the same 5.9 GHz band (5875-5905 MHz).

While LTE-V2X has been allocated a same frequency band, it uses different physical and medium access layers than 802.11p and encompasses two interfaces: (a) The wide area network LTE interface (Uu) that connects end-user devices and vehicles to base stations (eNBs) and the core network to provide vehicle to network (V2N) services; and (b) the direct communications interface (PC5) that connects vehicles to vehicles (V2V), to roadside infrastructure (V2I) and to pedestrians (V2P), for the provision of low-latency and high-reliability V2V/I/P services independently of any MNO relationship and cellular network availability. The WLAN-based and cellular-based ITS radio technologies each have strengths over the other and a collaborative system, at least in an interim period, is focusing on using both technologies in a dual radio solution. This is referred to herein as a "dual ITS radio" system.

In such a dual radio solution both IEEE 802.11p and 3GPP LTE-V2X will need to be supported and operate concurrently in the same 5.9 GHz frequency band which may lead to a variety of co-existence and co-channel interference issues in concurrent operation of both ITS radio systems. Notably, providing sufficient isolation for concurrent operation of two radio systems using the same band, or nearly identical frequencies, generally would require separate antennas and sharp-edge dedicated band pass filters in a dual ITS radio system, also referred to as a telematics control unit (TCU). These solutions are undesirable having steep costs in related materials/complexity and may be avoided based on inventive embodiments disclosed herein.

BRIEF DESCRIPTION OF THE DRAWINGS

Certain examples of circuits, apparatuses and/or methods will be described in the following by way of example only in reference to the accompanying drawing figures where.

DETAILED DESCRIPTION OF THE INVENTION

Figure 1:
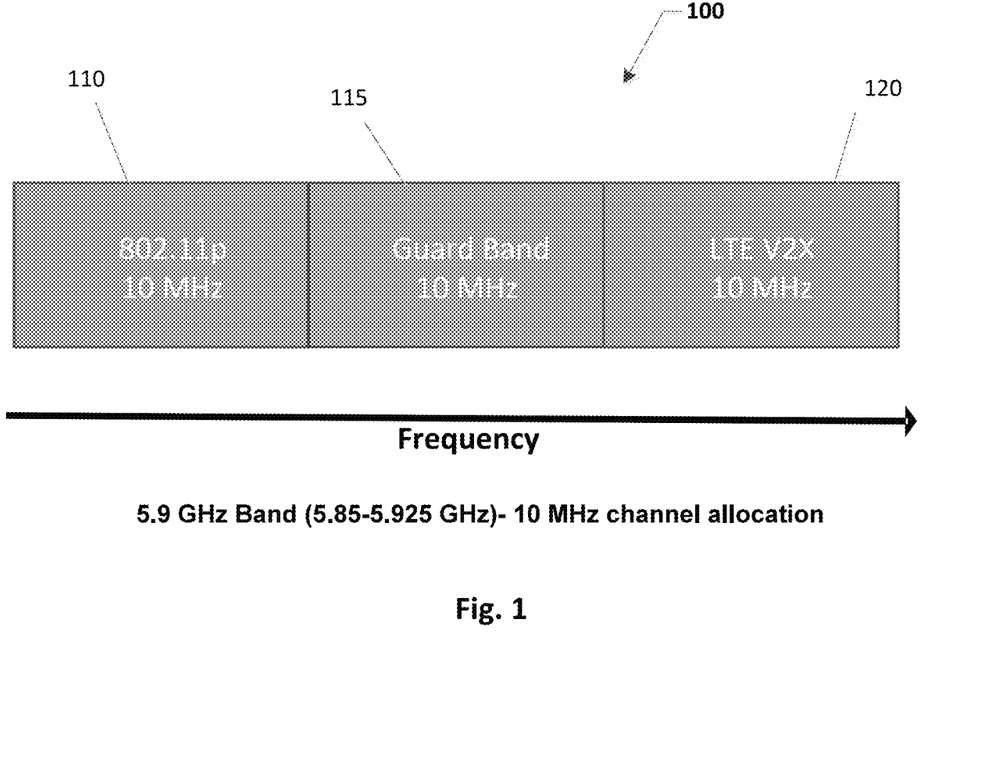
FIG. 1 is a block diagram that depicts an example allocation of frequency resources between 802.11p and LTE V2X systems with a "safe harbor" guard band.

Referring to FIG. 1, an example allocation 100 of frequency resources for two collocated ITS radios 110 and 120, e.g., an 802.11p radio and an LTE V2X radio, is shown. 802.11p and LTE V2X may send data frames in respective 10 MHz channels in the 5.9 GHz ITS band. Because of the relatively small channels and need to operate both ITS radios concurrently, it has been proposed to include a 10 MHz separation gap 115 between the 10 MHz channels allocated for each respective ITS radio technology as shown. This separation gap 115 in frequency between the two different types of ITS radio channels is referred to a "safe harbor" or guard band.

Because these different ITS systems are not synchronized, it is highly likely that one of the systems may be transmitting while the other is receiving at some point. Such a scenario requires isolation between the two radios, operating in the nearly identical frequencies to be extremely effective. Otherwise out-of-band radiation from one of the systems will be received in the other radio system causing self-interference in the system for two distinct cases: (i) a TX/RX mode, where one ITS radio is transmitting and the second ITS radio is receiving; and (ii) an RX only mode where neither ITS radio is transmitting but one or both are instead receiving.

In the TX/RX mode, the TX signal of one radio drowns out the intended receive signal of the other radio due to the fact that the collocated ITS radio transmitting on near frequency channel of the identical band, is inherently much greater in magnitude than any actual desired receive signal from a remote transmitter, e.g., another vehicle or roadside infrastructure transmitting, by virtue of the proximities of the respective transmitters in relation to the receiver. This will result in an unacceptable sensitivity degradation of the RX radio receiving the desired signal.

In the RX mode, at least one desired signal being received from a remote ITS radio, and perhaps both radios are concurrently receiving at very close frequency channels in the same band. One radio will inherently receiving signals from the opposite ITS system and may also cause degradation from interference of the other without the stringent and expensive isolation mechanisms previously discussed; even despite the safe harbor guard channel, particularly when a common antenna is used. Each of the two ITS radio's desired receive signal (from another vehicle or infrastructure ITS node) may pose issues to the opposing ITS radio's reception of its own desired ITS receive signal. Both of these TX/RX and RX mode interference issues are referred to herein as ITS radio "self-interference" (SI) because they are due to two independent, non-synchronized ITS radios using very close frequencies on a same platform device with a common antenna.

Certain example embodiments of the present invention relate to enabling concurrent operation of 802.11p/DSRC/G5 WLAN ITS radio and LTE-V2X/NR-V2X cellular ITS radio in a same transceiver, using a same, or common, antenna by using full duplex-"like" self-interference cancellation methods as described in more detail below. Various embodiments relate to processes and architectures for self-interference cancellation (SIC) of undesired signals due to the presence of the opposing ITS radio system (local or from another device) using a combination of interference cancellation mechanisms in the RF domain and in the analog and digital baseband domains to receive a desired ITS signal having acceptable quality.

In order to perform effective SIC, one can take advantage of available a priori knowledge of the interfering signals, their modulation and waveforms from the opposing ITS radio, by virtue of it being generated for transmission or is received and may be sampled, on the same device platform. Further, in some embodiments, one can exploit internal knowledge whether each radio is transmitting, receiving or inactive to adapt different SIC mechanism or policies to improve efficiency. For example, if both ITS radio transmit (TX) paths are active SIC may be turned off; if in a TX/RX mode, one SIC process may be used, or another varying SIC process may be used when a TCU is in RX mode, as defined above.

In a first inventive embodiment ITS radio SIC may be performed for the TX/RX mode, when one ITS radio system is transmitting and the other is receiving a desired signal using a same, or "common," antenna. While a "single" antenna may be shown and described, various embodiments may have more antennae, still common to both ITS radios, for example, if 2×2, or higher order, diversity reception is desired. In various embodiments, when the two different ITS radio systems concurrently operate, then an ITS radio SIC method may utilize a variety of signal estimation and cancellation techniques depending on their operating mode.

In order to provide a desired level of isolation of two ITS radios operating on a same frequency band using a common antenna, according to certain embodiments, a combination of SIC techniques may be utilized, including preferably, a combination of two or more of the following four techniques: (i) Passive RF isolation (e.g. a circulator); (ii) an active analog RF self-interference cancellation (RFSIC); (iii) an active analog baseband self-interference cancellation (ABSIC); and/or (iv) a self-interference cancellation in the digital baseband (DSIC). According to various embodiments, the particular combination SIC techniques, and how much each technique contributes to provide desired cancellation, may vary depending on the current mode of the radios, as well as the specific implementation of the transceiver system.

Figure 2:
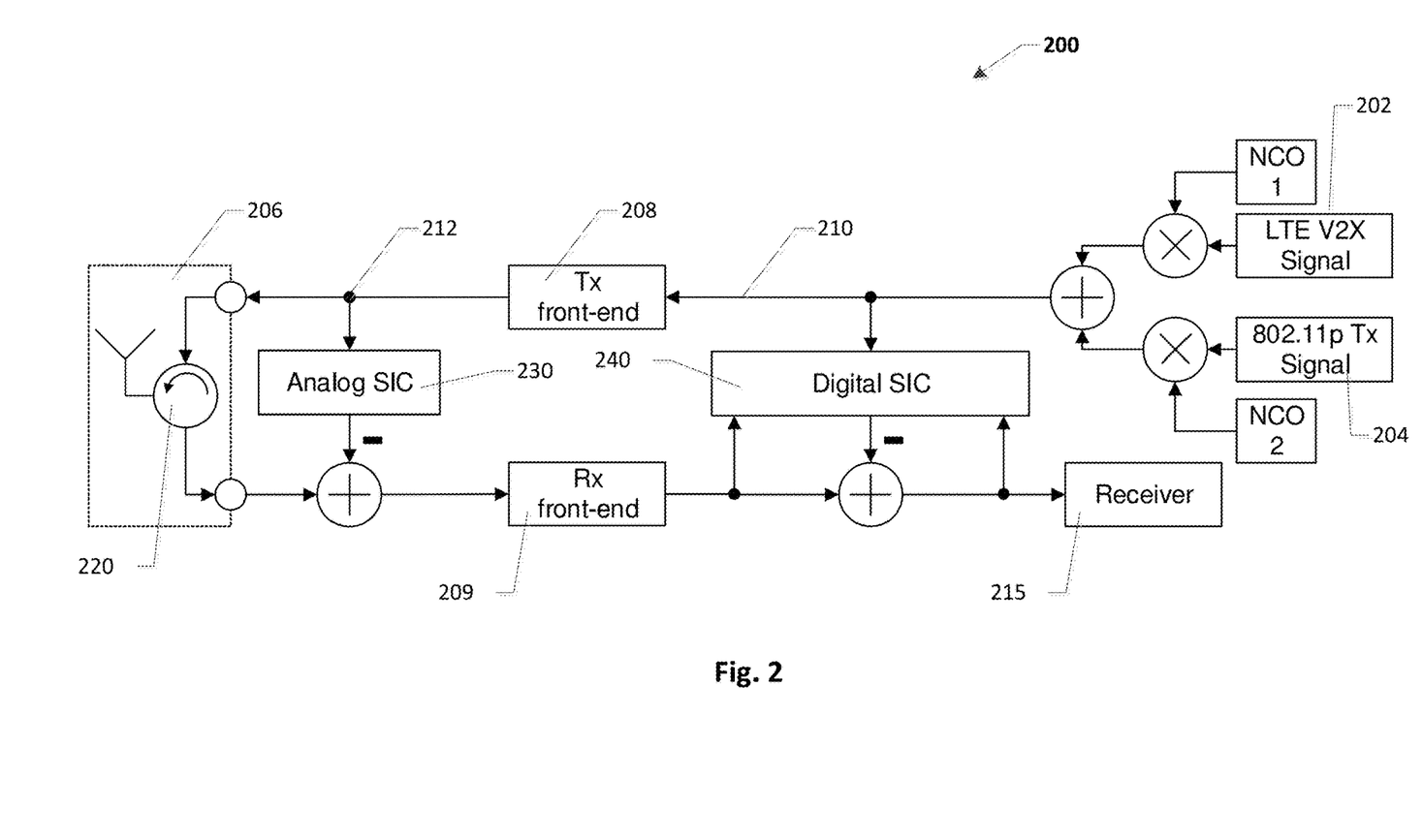
FIG. 2 is a block diagram illustrating a dual radio ITS transceiver with active interference cancelling according to one or more embodiments of the present disclosure.

According to one example embodiment, shown in FIG. 2, a device 200 for vehicular communications according to one embodiment, may generally include: a first intelligent transportation system (ITS) radio 202 adapted to communicate with remote ITS nodes using a first communication protocol such as an LTE V2X radio, and a second ITS radio 204 adapted to communicate with remote ITS nodes over a second wireless channel in the same frequency band, using a second communication protocol different from the first communication protocol, such as an 802.11p radio.

In this embodiment, a common antenna 206 may be communicatively coupled to the first and second ITS radios, represented by dual ITS radio TX inputs 202, 204, via a an RF front end 208 coupled through respective digital and analog signal paths 210, analog signal path 212, enabling simultaneous unsynchronized transmit (TX) signals from, and receive (RX) signals to, both ITS radios. Device 200 may also include ITS radio self-interference cancellation (SIC) circuitry adapted to reduce interference of desired RX signals at the first or second ITS radios due to communications by the opposite ITS radio, using a combination of circuits arranged to provide passive RF isolation of respective radio signals at the common antenna, active analog radio frequency self-interference cancellation (RFSIC) and baseband self-interference cancellation.

In this embodiment, ITS radio SIC circuitry includes RF isolator 220 to passively isolate the respective radios signals at the common antenna. Additionally, an active analog RF SIC circuit 230 uses a phase shifted version of the ITS radio that is transmitting, to destructively cancel a majority of it being received by the opposing ITS radio that is receiving, in a TX/RX dual radio mode discussed previously. Lastly, to cancel any remaining unwanted transmit signal components, a digital baseband SIC circuit 240 may be included which provides an inverse of the transmit signal in the digital domain.

Figure 3:
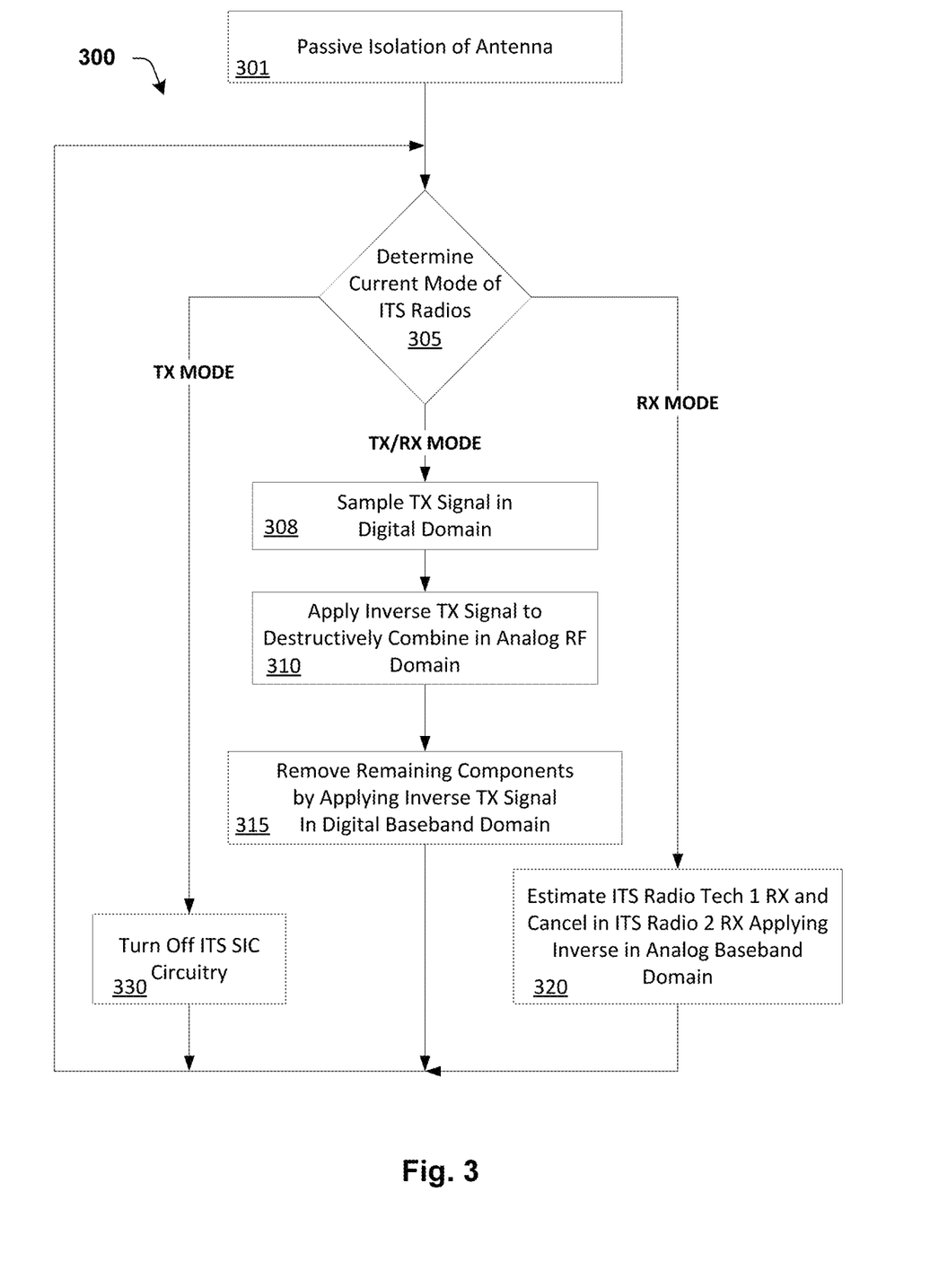
FIG. 3 is a flow diagram detailing an example process for concurrent operation of a dual radio ITS transceiver according to various embodiments.

Referring to FIG. 3, a method 300 of operation of the transceiver 200 having dual ITS radios operating in a same frequency band using a common antenna shown in FIG. 2, may generally include, passively isolating 301 the first and second ITS radios connection to the common antenna (at least initially, for example, during manufacture). Next, process 300 may include identifying or determining 305 a current mode of operation of each of the ITS radios between transmitting (TX), receiving (RX) or inactive states. If operating in a TX/RX mode, i.e., one radio transmitting and one radio receiving, method 300 includes applying an ITS dual radio self-interference cancellation (SIC) process including reducing interference of a desired RX signal of one ITS radio, due to a TX signal of the other ITS radio, by applying inverse cancelling versions of the TX signal to the RX signal in both of an RF analog domain and a digital baseband domain to derive an acceptable quality desired RX signal.

Here sampling 308 of transmit signals is performed in the digital domain and stored for DSIC (e.g., circuit 240; FIG. 2), before they are they are sent through the transmitter RF front-end (208; FIG. 2). After the power amplifier (PA), along analog signal path 212, a portion of the transmit signal is split off, for analog radio frequency self-interference cancellation (RFSIC circuit 230; FIG. 2), where it is phase shifted and attenuated or amplified, depending on the magnitude of the signals split from the TX path 208, to inversely match the strongest component of self-interference from the TX signal of one ITS radio, being received by the opposing ITS radio. This inverse RF cancellation signal is coupled 310 to the RX analog signal to destructively combine a majority of RF self-interference from the TX ITS radio at the RX ITS radio receive path.

Due to the fairly significant power difference between the TX interference signal and RX desired signal, in some embodiments, the inverse RF analog signal cancellation signal should preferably be applied 310 into the receive chain before the low noise amplifier (LNA) (i.e., shown coupled before RX front end 209, in FIG. 2). In this manner, the power will be sufficiently small enough to be covered by the dynamic range of the receiver, including the analog-to-digital converter (ADC) of the receive chain.

Any remaining interference signal components, including non-linear components, may be further cancelled 315 in the digital domain using a digital baseband self-interference (DSIC) processes (e.g., DSIC circuit/logic 240; FIG. 2), based on the original stored TX sampling 309. In this embodiment, because the DSIC circuit 240 in FIG. 2 can be implemented at a chip level, a benefit of low cost, large scale integration and production is afforded for the inventive embodiments.

Referring back to FIG. 3, if it is determined 305 that both ITS radios are transmitting, or one is transmitting and the other is inactive (not receiving), i.e., a TX mode, then ITS SIC is not necessary and active SIC processes may be turned off 330 to conserve power or processor/memory bandwidth. Additionally, if neither of the dual ITS radios are transmitting and one or both radios are receiving signals, i.e., in "RX" mode, then the SIC circuits and logic described above may also be turned off, if desired.

In some embodiments, however, if determined 305 in RX mode, an embodiment for ITS self-interference cancellation (SIC) process may be applied 320 to cancel each opposing ITS radio technology's interference from interfering with its own intended receive signal. In this example embodiment, a receive mode dual ITS radio SIC method may include cancellation of the opposing radios interference with a desired receive signal by applying 320 an inverse destructive combining signal in an analog baseband domain, referring to the example architectures of FIGS. 4 and 5.

An RX mode dual ITS radio SIC method and architecture of these embodiments are configured to protect a receiver from interference, referred to as "blockers," present from one ITS radio technology (e.g., 802.11p/GT-5/DSRC) from affecting signals being received at the ITS radio utilizing a different technology (e.g., LTE/NR V2X and/or vice versa) in the same frequency band. In the embodiment shown in FIGS. 4 and 5, the example configuration uses a 2×2 multiple input multiple output (MIMO) chain diversity reception on a user equipment (UE) RF platform, though a similar approach may also be used for SISO architectures. When signals from one or both of the two different ITS radio system technologies are being received though neither is transmitting, i.e., the RX mode, there may be blockers from the opposing ITS radio system present, whether the opposing ITS radio system is also receiving or not, due to the presence of remote transmitters from opposing ITS radio system's network operating in the same 5.9 GHz band.

Figure 4:
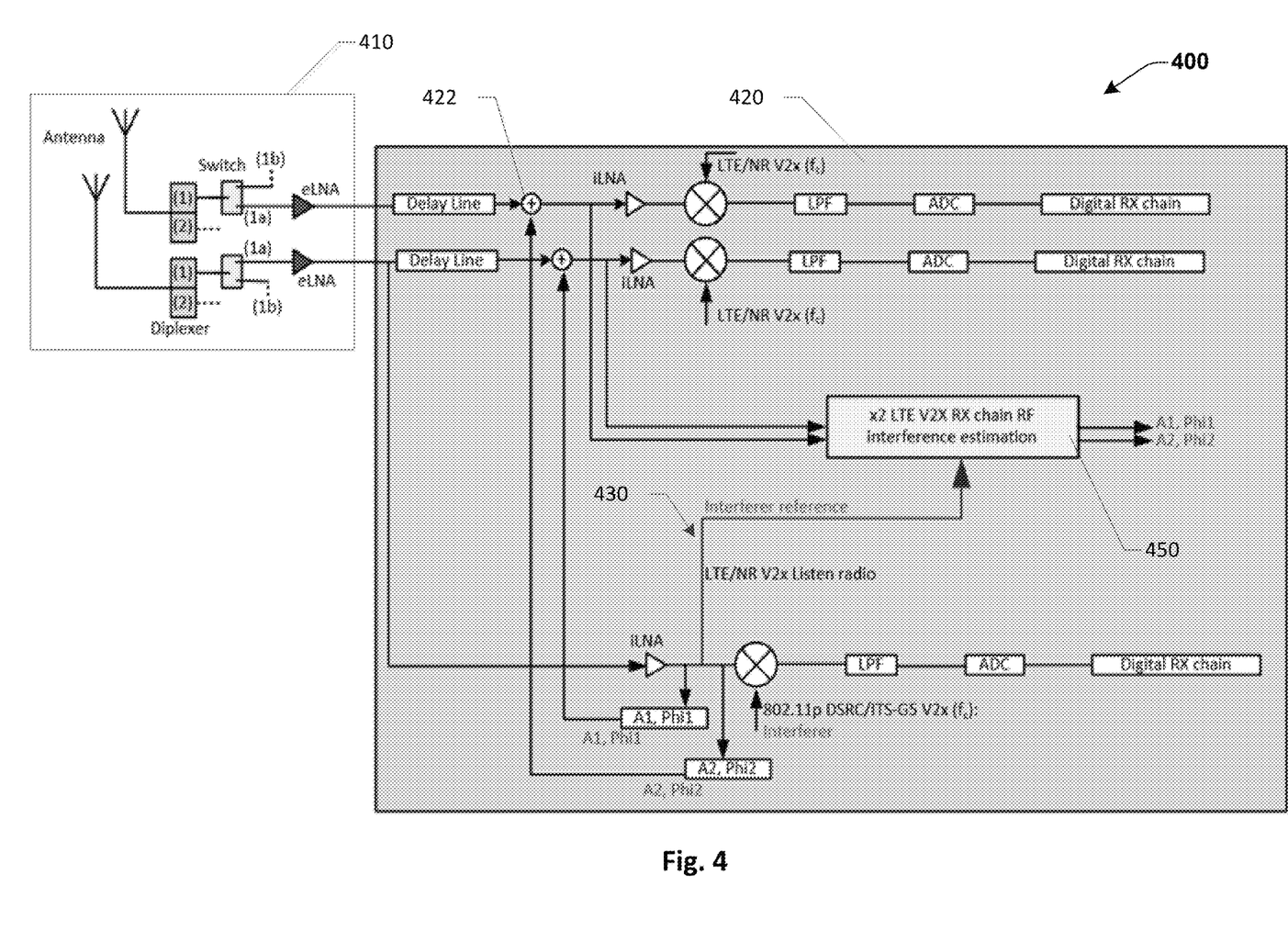
FIG. 4 is a block diagram illustrating a 2×2 MIMO system of a dual radio ITS receiver with interference cancelling according to another embodiment of the invention.
Figure 5:
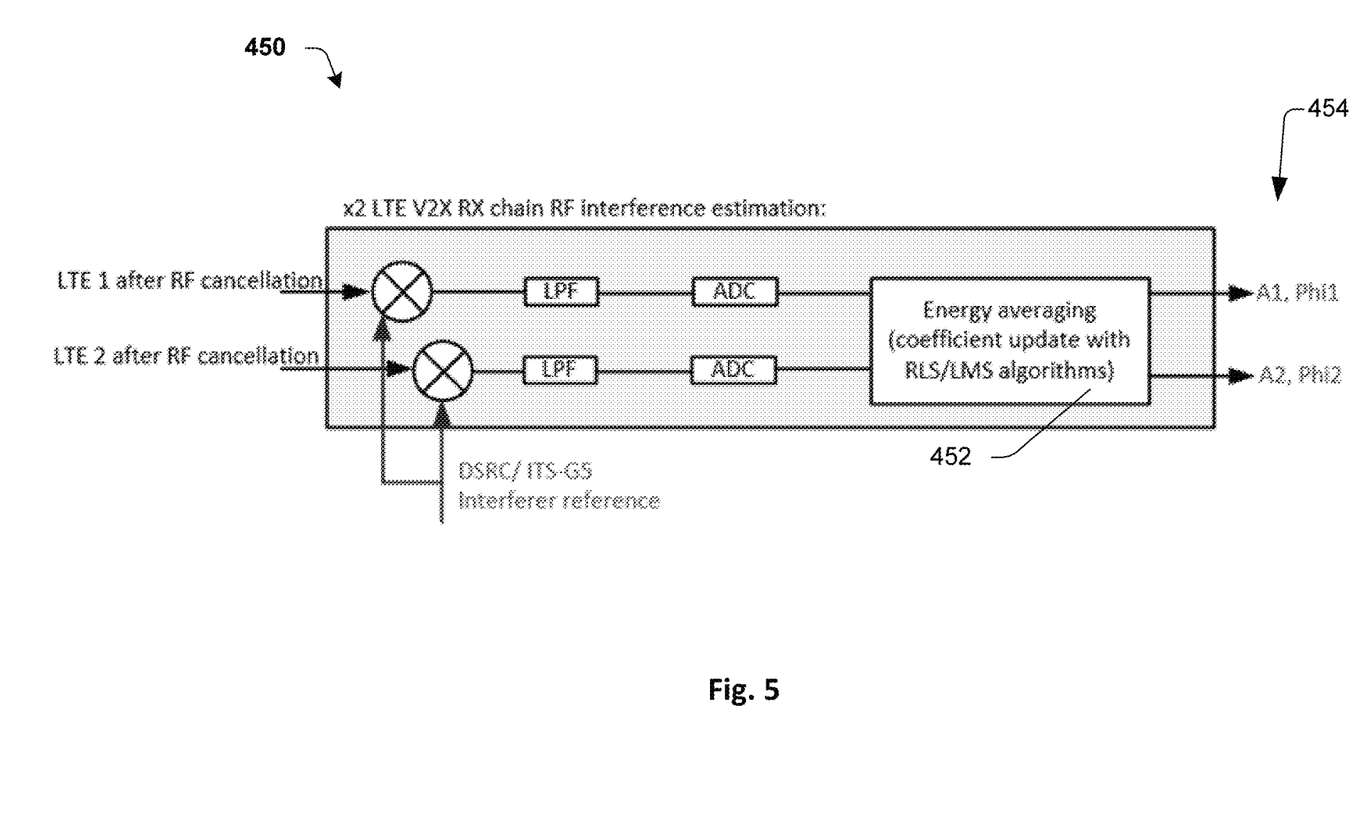
FIG. 5 is a block diagram illustrating a more detailed example of an RF interferer estimation circuit from the transceiver of FIG. 4.

FIGS. 4 and 5 show one possible example architecture embodiment for an RX mode dual ITS radio SIC circuit able to reduce undesirable self-interference in this scenario. It should be noted, if both ITS radio technologies may be receiving concurrently, the architecture may be adapted for dual ITS radio reception SIC, i.e., blockers from both radio technologies are present for concurrent dual ITS radio reception, the embodiments should be configured in parallel on the receiver chains of each ITS radio systems, as only one is shown in FIG. 4 for simplified understanding.

FIG. 4 is a block diagram architecture 400 illustrated in the context of avoiding RX interference (blockers) from one ITS radio technology, e.g., 802.11p, de-sensitizing the wanted RX signal of other radio ITS radio technology where signal denotation have the following meaning:

1a=RX path: ITS frequency band for radio 802.11p and LTE-NR V2X (2×2 MIMO)
    1b=TX path: ITS frequency band for radio 802.11p and LTE-NR V2X (2×2 MIMO)
    2=TX/RX path: non-ITS LTE/NR frequency bands with wide-band reception offered by ITS antenna (require TDD/FDD components like switches/duplexers)

In this embodiment, dual ITS radio receiver 400 includes RX SIC circuitry for cancellation of 802.11p interference in receiving at the LTE V2X radio as shown in FIGS. 4 and 5, though this may be reversed, or both ITS radio receive chains may implement RX mode SIC of the opposing ITS radio system signals, as desired by a system architect. Here, an RF module 410 includes a common 2×2 MIMO antenna, and potentially other components such as diplexers, switches and external LNAs (eLNAs) as desired, to receive signals for each ITS radio in receiver module 420. As shown, the LTE V2X radio receives over a dual diversity receive chain and the 802.11p receive chain uses a single input, split from one of the MIMO antennas common to the LTE V2X reception. It should be noted that only components of receiver 400 are shown and referenced that are relevant to explanation or RX mode dual ITS radio SIC, and in no way limits from including ITS or other transmitters and receivers from being included.

In this example configuration of the inventive embodiments, receiver module 420 extracts an amplified signal 430 from the 802.11p radio receive path (referred to as "listening radio" or "interference listening") as an input to an RF interference estimation circuit 450 (shown in closer detail in FIG. 5), to differentiate from LTE V2X RX signals. At interference estimation circuit 450, the two ITS radio technology signals are differentiated and the interference noise can be estimated and cancellation coefficients updated based on energy averaging equalization using recursive least square (RLS)/least mean square (LMS) adaptive filtering algorithms to provide cancelling signals 452 summing 422 into each of the RX diversity paths of the LTE V2X radio, thereby providing an RX mode SIC of noise due to non-localized transmissions in the opposing ITS radio technology ecosystem.

A significant advantage of the various embodiments is that it may saves space by utilizing a common antenna integration in a vehicle. For example, in a SISO configuration with two radio technologies (802.11p and LTE/NR V2x), one antenna instead of two could be employed. For 2×2 MIMO configuration with two radio technologies, two antennas instead of four could be employed and so on. This reduces antenna cabling weight within the car, reduces bill of antenna materials and testing complexity.

Accordingly, irrespective of one ITS radio system receiving or two ITS radio systems receiving (concurrently), the inventive embodiments provide acceptable isolation without requiring any steep micro-tunable SAW filters to meet the planned safe-harbor frequency allocation discussed in reference to FIG. 1, thereby reducing material costs that may otherwise be required for alternative solutions. Various embodiments disclosed herein may additionally enable concurrent operation of future WLAN based on IEEE technology (e.g., similar to that of 802.11p DSRC/ITS-G5) and possibly future ITS-NR-V2X for 3GPP release 16 or beyond, particularly where frequency band allocations for futuristic WLAN and NR V2X ITS are either exactly the same or adjacent or safe harbored. Example embodiments described herein offer solutions having a significant commercial advantage for multiple vertical industries.

In FIGS. 4-5, ADCs for LTE/NR V2X listening radio 430 and RF interference estimation blocks 450 may be shared if appropriate. Depending on whether one ITS radio system or two radio systems are received, the embodiment shown in FIG. 4, as well as RLS/LMS adaptive filtering algorithms, may be suitably adapted.

Based on the foregoing embodiments, all possible combinations of LTE/NR and 802.11p/DSRC V2X operations can be configured for effective SIC by using the architectures of FIG. 2 and FIG. 4-5. Similar approaches can be extended to future WLAN and 5G-NR-V2x under worst case assumption that both these radio technologies are destined to share the same frequency spectrum across the globe.

Figure 6:
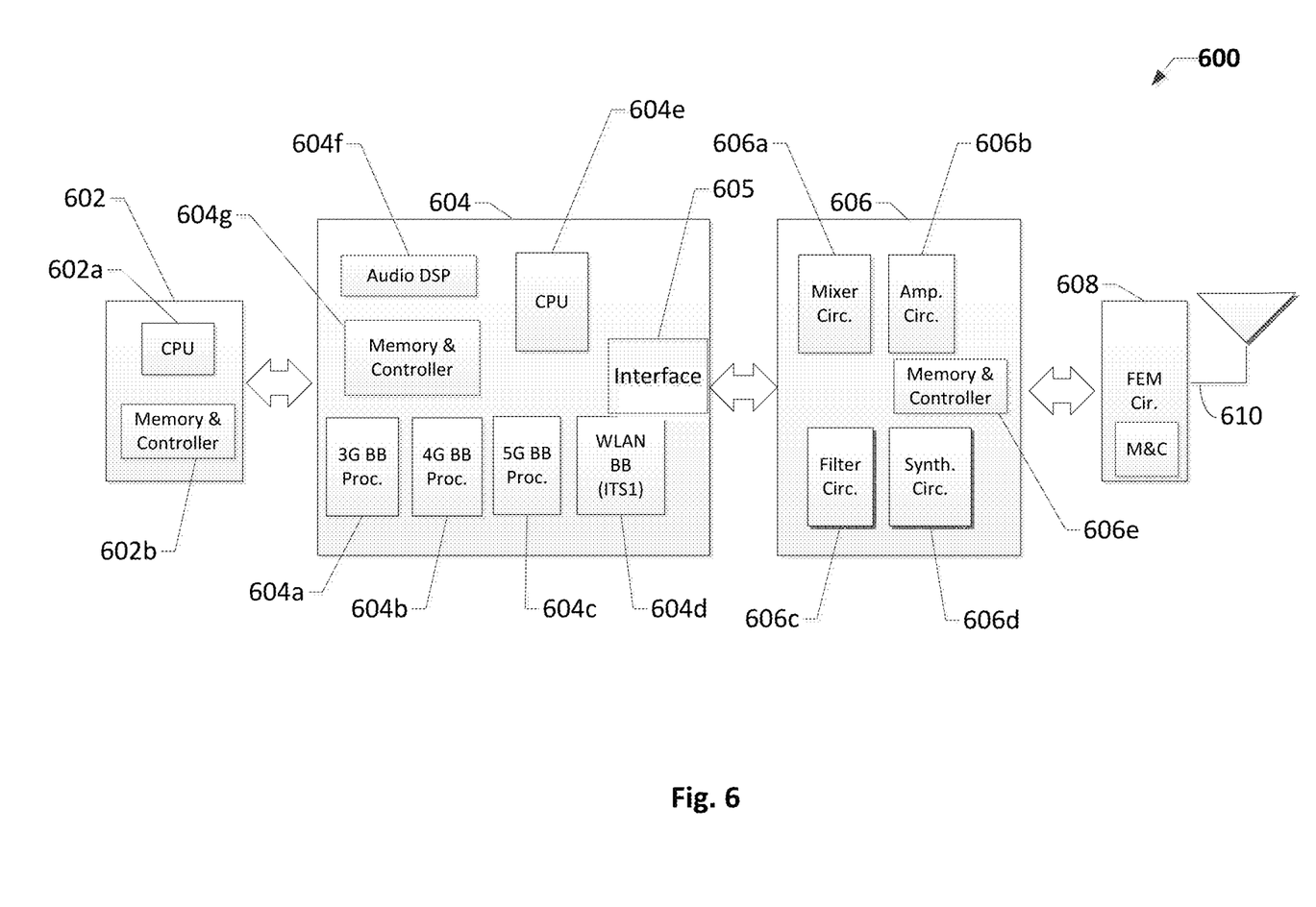
FIG. 6 is a functional block diagram illustrating a wireless communication device to which the inventive embodiment may be implemented.

The dual radio transceiver and interference cancellation embodiments previously described, may be utilized in a wireless communication device as shown in FIG. 6. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 6 illustrates, for one embodiment, example components of an electronic device 600 such as part of a user equipment (UE) or a telematics control unit (TCU). In some embodiments, the electronic device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors or processing units. For example, the application circuitry 602 may include circuitry such as, but not limited to, one or more single-core or multi-core processors 602a. The processor(s) 602a may include any combination of general-purpose processors and dedicated processors (e.g., graphics processors, application processors, etc.). The processors 602a may be coupled with and/or may include computer-readable media 602b (also referred to as "CRM 602b", "memory 602b", "storage 602b", or "memory/storage 602b") and may be configured to execute instructions stored in the CRM 602b to enable various applications and/or operating systems to run on the system and/or enable features of the inventive embodiments to be enabled.

The baseband circuitry 604 may include circuitry such as, but not limited to, one or more single-core or multi-core processors to arrange, configure, process, generate, transmit, receive, or otherwise utilize the dual ITS radio SIC processes as described in various embodiments herein. The baseband circuitry 604 may include one or more baseband processors and/or control logic to process baseband signals received from a receive signal path of the RF circuitry 606 and to generate baseband signals for a transmit signal path of the RF circuitry 606. RF circuitry 606 may include ITS radio mixing chains for a common antenna, at least two mixing chains having a local oscillators in one chain/mixing split being different from the other proximate mixing chain, to reduce potential cross talk interference between mixing chains per antenna of a transmitted or received signal having two or more peak carrier frequencies. RF circuitry 606 and/or front end circuit 608 and antennas 610 being adapted per various inventive embodiments discussed above.

Baseband circuit 604 may interface with the application circuitry 602 for generation and processing of the baseband signals and for controlling operations of the RF circuitry 606. For example, in some embodiments, the baseband circuitry 604 may include a third generation (3G) baseband processor 604a, a fourth generation (4G) baseband processor 604b, a fifth generation (5G)/NR baseband processor 604c, and 802.11p/DSRC baseband processor(s) 604d for WLAN and other basebands related to existing generations, generations in development or to be developed in the future (e.g., 6G, etc.). The baseband circuitry 604 (e.g., one or more of baseband processors 604a-d) may handle various radio control functions that enable communication with one or more radio networks or remote terminals via the RF circuitry 606. The radio control functions may include, but are not limited to, signal modulation/demodulation, encoding/decoding, radio frequency shifting, and the like. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may include elements for compression/decompression and echo cancellation and may include other suitable processing elements in other embodiments. The baseband circuitry 604 may further include computer-readable media 604g (also referred to as "CRM 604g", "memory 604g", "storage 604g", or "CRM 604g"). The CRM 604g may be used to load and store data and/or instructions for operations performed by the processors of the baseband circuitry 604. CRM 604g for one embodiment may include any combination of suitable volatile memory and/or non-volatile memory. The CRM 604g may include any combination of various levels of memory/storage including, but not limited to, read-only memory (ROM) having embedded software instructions (e.g., firmware), random access memory (e.g., dynamic random access memory (DRAM)), cache, buffers, etc.). The CRM 604g may be shared among the various processors or dedicated to particular processors. Components of the baseband circuitry 604 may be suitably combined in a single chip, a single chipset, or disposed on a same circuit board in some embodiments. In some embodiments, some or all of the constituent components of the baseband circuitry 604 and the application circuitry 602 may be implemented together, such as, for example, on a system on a chip (SOC).

In some embodiments, the baseband circuitry 604 may provide for communication compatible with one or more radio technologies. For example, in some embodiments, the baseband circuitry 604 may support communication with an E-UTRAN, NR and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., (e.g., mixing chains) to facilitate the communication with the wireless network. RF circuitry 606 may include a receive signal path that may include circuitry to down-convert RF signals received from the FEM circuitry 608 and provide baseband signals to the baseband circuitry 104. RF circuitry 606 may also include a transmit signal path that may include circuitry to up-convert baseband signals provided by the baseband circuitry 604 and provide RF output signals to the FEM circuitry 608 for transmission. FEM 608 may be dynamically selectable, or statically configured to have components arranged to transmit/receive signals per antenna path which are not identical to another receive path in order to processes signals to have reduced interference compared to alternative paths. In other words, the FEM may include switchable filters and analog processing elements which are different for each different possible antenna configuration available. It is noted that each antenna and XMIT/RCV chain of device 600 may not be identical to, i.e., not the same as, at least one other antenna XMIT/RCV path so that platform interference, such as LO crosstalk in processing multiple carriers per antenna, may be reduced.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604, for example via RF interface 605, for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path will include at least two different mixer configurations, and may be arranged for quadrature downconversion and/or upconversion, respectively. In some embodiments, the mixer circuitry 606a of the receive signal path and the mixer circuitry 606a of the transmit signal path may include at least two different signal paths, wherein each signal path is for processing different radio frequencies from the other signal path.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio frequency IC circuitry may be provided for processing signals for each radio chain, although the scope of the embodiments is not limited in this respect.

In some embodiments, the synthesizer circuitry 606d may be a fractional-N synthesizer or a fractional N/N+1 synthesizer, although the scope of the embodiments is not limited in this respect, as other types of frequency synthesizers may be suitable. For example, synthesizer circuitry 606d may be a delta-sigma synthesizer, a frequency multiplier, or a synthesizer comprising a phase-locked loop with a frequency divider. The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer. For dual ITS radios, the analog components may be separate or certain portions shared where possible.

In some embodiments, frequency input may be provided by a voltage controlled oscillators (VCO), although that is not a requirement. Divider control input may be provided by either the baseband circuitry 604 or the application circuitry 602 depending on the desired output frequency. In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include at least two ITS radio receive signal paths that differ from each other and may include circuitry configured to operate on RF signals received from two or more antennas 610, amplify the received signals and provide the amplified versions of the received signals to the RF circuitry 606 for further processing. In some embodiments, FEM circuitry 608 may include at least two transmit signal paths that may include circuitry different from the other and configured to amplify signals for transmission provided by the RF circuitry 606 for transmission by one or more of the one or more antennas 610. In some embodiments, the FEM circuitry 608 may include a TX/RX switch to switch between transmit mode and receive mode operation. The FEM circuitry 608 may include two ITS receive signal paths and two transmit signal paths but at least multiple paths for RCV or XMIT which are not identical to another. Each receive signal path(s) of the FEM circuitry may include a low-noise amplifier (LNA) to amplify received RF signals and provide the amplified received RF signals as an output (e.g., to the RF circuitry 606). The transmit signal path(s) of the FEM circuitry 608 may include a power amplifier (PA) to amplify input RF signals (e.g., provided by RF circuitry 606), and one or more filters to generate RF signals for subsequent transmission (e.g., by two or more antennas 610).

In some embodiments, the electronic device 600 may include additional elements such as, for example, a display, a camera, one or more sensors, and/or interface circuitry (for example, input/output (I/O) interfaces or buses) (not shown).

Those of skill in the art would recognize modifications and substitutions of the elements, components and circuits described herein and possible and the invention is not limited to the specific examples in the detailed description but rather by the appended claims.

Disclaimer: The present disclosure has been described with reference to the attached drawing figures, with certain example terms and wherein like reference numerals are used to refer to like elements throughout. The illustrated structures, devices and methods are not intended to be drawn to scale, or as any specific circuit or any in any way other than as functional block diagrams to illustrate certain features, advantages and enabling disclosure of the inventive embodiments and their illustration and description is not intended to be limiting in any manner in respect to the appended claims that follow, with the exception of 35 USC 112, sixth paragraph claims using the literal words "means for," if present in a claim.

As utilized herein, the terms "component," "system," "interface," "logic," "circuit," "device," and the like are intended only to refer to a basic functional entity such as hardware, software (e.g., in execution), logic (circuits or programmable, firmware alone or in combination to suit the claimed functionalities. For example, a component, module, device or processing unit may mean a microprocessor, a controller, a programmable logic array and/or a circuit coupled thereto or other logic processing device, and a method or process may mean instructions running on a processor, firmware programmed in a controller, an object, an executable, a program, a storage device including instructions to be executed, a computer, a tablet PC and/or a mobile phone with a processing device.

By way of illustration, a process, logic, method or module can be any analog circuit, digital processing circuit or combination thereof. One or more circuits or modules can reside within a process, and a module can be localized as a physical circuit, a programmable array, a processor. Furthermore, elements, circuits, components, modules and processes/methods may be hardware or software, combined with a processor, executable from various computer readable storage media having executable instructions and/or data stored thereon. Those of ordinary skill in the art will recognize various ways to implement the logical descriptions of the appended claims and their interpretation should not be limited to any example or enabling description, depiction or layout described above, in the abstract or in the drawing figures.

Example Embodiments

In a First example embodiment, a device is disclosed for vehicular communications including: a first intelligent transportation system (ITS) radio adapted to communicate with remote ITS nodes using a first communication protocol; a second ITS radio adapted to communicate with remote ITS nodes over a second wireless channel in the same frequency band using a second communication protocol different from the first communication protocol; a common antenna communicatively coupled to the first and second ITS radios enabling simultaneous unsynchronized transmit (TX) signals from, and receive (RX) signals to, both ITS radios; and self-interference cancellation (SIC) circuitry adapted to reduce interference of desired RX signals at the first or second ITS radios due to communications by the opposite ITS radio using a combination of circuits arranged to provide passive RF isolation of respective radio signals at the common antenna, active analog radio frequency (RF) self-interference cancellation (RFSIC) and baseband self-interference cancellation.

In a Second example embodiment, the First example is further narrowed wherein the circuit arranged to provide baseband self-interference cancellation is at least one of active analog baseband interference cancellation and digital baseband interference cancellation and configured to reduce unwanted components of interference signals of the opposite ITS radio by providing applying an inverse component of the respective analog or digital baseband signal to the desired RX signal.

In a Third example embodiment, the First example is furthered wherein the SIC circuitry includes: a passive RF isolation device to isolate the first and second ITS radio couplings to the common antenna; an active analog RF SIC circuit to mix a phase shifted analog RF cancellation signal to an RX signal received by the first or second ITS radios, the analog RF cancellation signal corresponding to a phase shifted version of an analog RF TX signal by the opposite ITS radio; and a digital baseband SIC circuit to further cancel undesired components of the RX signal received by the first or second ITS radios.

According to a Fourth example embodiment, the First example is furthered wherein the SIC circuitry includes: a passive RF isolation device to isolate the first and second ITS radio couplings to the common antenna; and an active analog baseband SIC circuit to mix inverse analog baseband cancellation signals to analog baseband RX signals received by one or both of the first and second ITS radios, the inverse analog baseband cancellation signals corresponding to a phase shifted version of the analog baseband RX signal intended for the opposite ITS radio.

A Fifth example may expand on any of the First through Fourth example embodiments wherein the circuit to provide passive RF isolation comprises a circulator.

A Sixth example may further any of the First through Fourth examples wherein one of the first or second communication protocols is compatible with an Institute for Electrical and Electronics Engineer (IEEE) 802.11p vehicular communications protocol.

A Seventh example embodiment may further any of the First through Fourth examples by the first or second communication protocols being compatible with a Third Generation Partnership Project (3GPP) Long Term Evolution (LTE) or New Radio (NR) V2X vehicular communications protocol.

In an Eighth example, a system is disclosed for communicating in an intelligent transportation system (ITS), the system including: a first ITS radio adapted to communicating in a first ITS network using wireless local area network (WLAN) communications; a second ITS radio adapted to communicate in a second ITS network using cellular-based communications in a same frequency band used by the WLAN; a common antenna passively isolated to the first and second ITS radios; and an ITS self-interference cancellation (SIC) circuit adapted to cancel interference received at the first or second ITS radio due to local or remote transmissions related to the opposite ITS radio operating in a same frequency band switchably between a transmit/receive (TX/RX) mode using a first SIC process and an RX mode using a second, different, SIC process.

According to a Ninth example embodiment, the Eight example may further be defined by the first SIC process of the TX/RX mode comprises an active RF interference cancellation process and a digital baseband cancellation process.

A Tenth example may further the Ninth by the second SIC process of the RX mode comprises an analog baseband cancellation process.

An Eleventh example embodiment may further any of the Eighth through Tenth by one of the first or second ITS radios uses protocols compatible with an Electronics Engineer (IEEE) 802.11p vehicular communications protocol.

A Twelfth example may further any of the Eighth through Tenth examples by one of the first or second ITS radios uses protocols compatible with a Third Generation Partnership Project (3GPP) Long Term Evolution (LTE) or New Radio (NR) V2X vehicular communications protocol.

A Thirteenth example furthers any of the Eighth through Tenth by the common antenna is passively isolated to the first and second ITS radios using a circulator.

A Fourteenth example may further define the Eighth through Tenth by the ITS SIC circuit is further switchable to a transmit only mode (TX mode) comprising turning off any active SIC processes.

In a Fifteenth example, a computer readable medium is defined for an intelligent transportation system (ITS) dual radio device, including instructions, which when executed by a processor, cause the ITS dual radio device to selectively operate self-interference cancellation (SIC) modes including: a transmit/receive (TX/RX) mode using a first SIC process; and an RX mode using a second, different, SIC process.

A Sixteenth example includes a further definition of the Fifteenth by the first SIC process of the TX/RX mode comprises an active RF interference cancellation process and a digital baseband cancellation process.

A Seventeenth example embodiment furthers the Fifteenth by the second SIC process of the RX mode comprises an analog baseband cancellation process.

In an Eighteenth example embodiment, the Fifteenth through Seventeenth may further be defined by the ITS dual radio device includes a first radio that uses protocols compatible with an Electronics Engineer (IEEE) 802.11p vehicular communications protocol.

In an Nineteenth example embodiment, the Fifteenth through Seventeenth may further be defined by the ITS dual radio device includes a second radio that uses protocols compatible with a Third Generation Partnership Project (3GPP) Long Term Evolution (LTE) or New Radio (NR) V2X vehicular communications protocol.

In a Twentieth example embodiment, the Fifteenth through Seventeenth may further be defined by the ITS dual radio device includes a first ITS radio and a second ITS radio coupled to a common antenna by a circulator, and operating using a safe-harbor frequency channel allocation in a same frequency band.

Lastly, a Twenty-first example embodiment furthers, the Fifteenth through Seventeenth by including further instructions that when executed, cause the ITS dual radio device to selectively operate self-interference cancellation (SIC) modes further including: a TX only mode wherein any active SIC process is turned off.

What is claimed is:
1. A device for vehicular communications comprising:
a first intelligent transportation system (ITS) radio adapted to communicate with remote ITS nodes using a first communication protocol;
a second ITS radio adapted to communicate with remote ITS nodes over a second wireless channel in the same frequency band using a second communication protocol different from the first communication protocol;
a common antenna communicatively coupled to the first and second ITS radios enabling simultaneous unsynchronized transmit (TX) signals from, and receive (RX) signals to, both ITS radios; and
self-interference cancellation (SIC) circuitry adapted to reduce interference of desired RX signals at the first or second ITS radios due to communications by the opposite ITS radio using a combination of circuits arranged to provide passive RF isolation of respective radio signals at the common antenna, active analog radio frequency (RF) self-interference cancellation (RFSIC) and baseband self-interference cancellation.

2. The device of claim 1 wherein the circuit arranged to provide baseband self-interference cancellation is at least one of active analog baseband interference cancellation and digital baseband interference cancellation and configured to reduce unwanted components of interference signals of the opposite ITS radio by providing applying an inverse component of the respective analog or digital baseband signal to the desired RX signal.

3. The device of claim 1 wherein the SIC circuitry comprises:
- a passive RF isolation device to isolate the first and second ITS radio couplings to the common antenna;
- an active analog RF SIC circuit to mix a phase shifted analog RF cancellation signal to an RX signal received by the first or second ITS radios, the analog RF cancellation signal corresponding to a phase shifted version of an analog RF TX signal by the opposite ITS radio; and
- a digital baseband SIC circuit to further cancel undesired components of the RX signal received by the first or second ITS radios.

4. The device of claim 1 wherein the SIC circuitry comprises:
- a passive RF isolation device to isolate the first and second ITS radio couplings to the common antenna; and
- an active analog baseband SIC circuit to mix inverse analog baseband cancellation signals to analog baseband RX signals received by one or both of the first and second ITS radios, the inverse analog baseband cancellation signals corresponding to a phase shifted version of the analog baseband RX signal intended for the opposite ITS radio.

5. The device of claim 1 wherein the circuit to provide passive RF isolation comprises a circulator.

6. The device of claim 1 wherein one of the first or second communication protocols is compatible with an Institute for Electrical and Electronics Engineer (IEEE) 802.11p vehicular communications protocol.

7. The device of claim 1 wherein one of the first or second communication protocols is compatible with a Third Generation Partnership Project (3GPP) Long Term Evolution (LTE) or New Radio (NR) V2X vehicular communications protocol.

8. The device of claim 1 wherein the common antenna is coupled to the first ITS radio and the second ITS radio.

9. The device of claim 1 wherein the common antenna is physically coupled to the first ITS radio and the second ITS radio.

* * * * *